Figure 1:
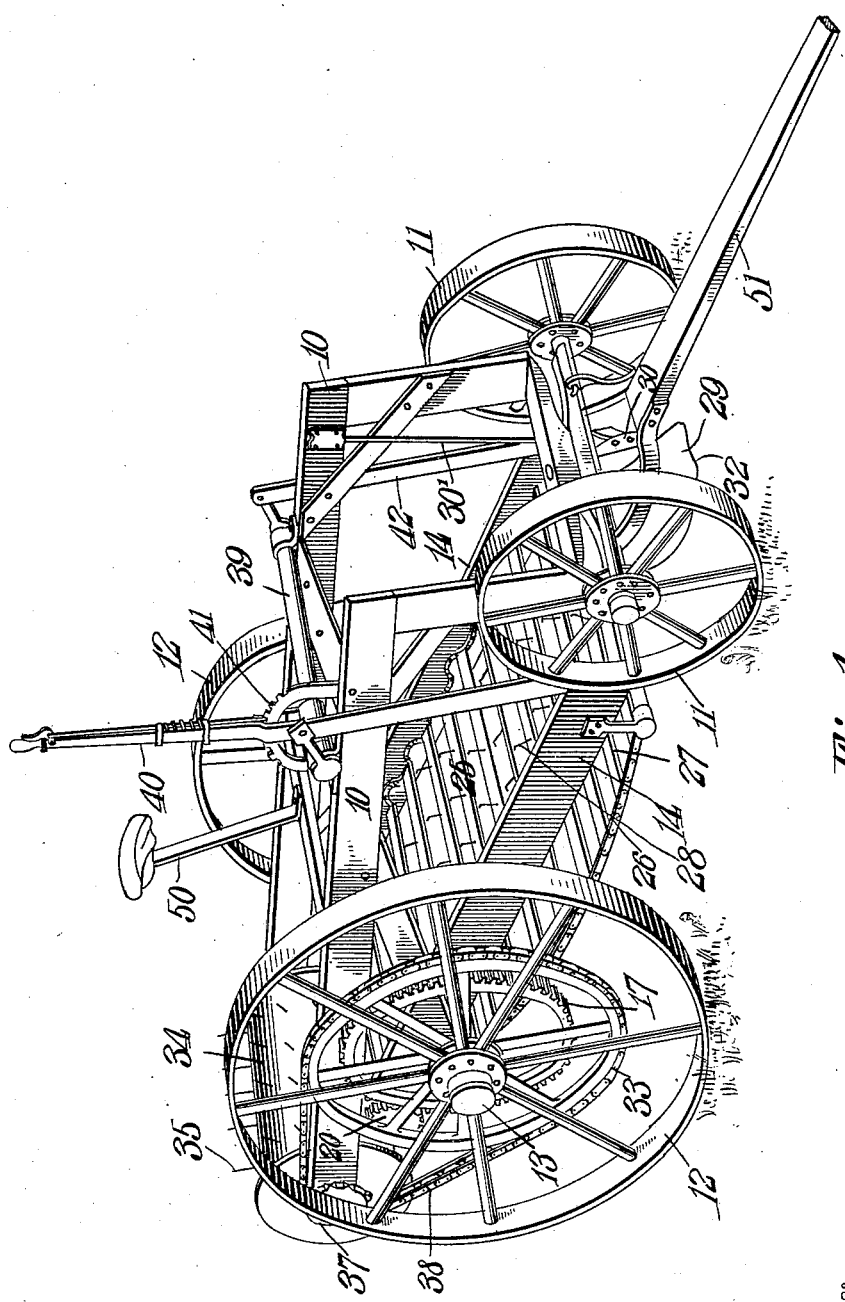

H. C. PICKEL.
QUACK GRASS EXTERMINATOR.
APPLICATION FILED MAR. 13, 1908.

915,110.

Patented Mar. 16, 1909.
2 SHEETS—SHEET 1.

Witnesses

Inventor
Henry C. Pickel,
By C. A. Snow & Co.
Attorneys

H. C. PICKEL.
QUACK GRASS EXTERMINATOR.
APPLICATION FILED MAR. 13, 1908.
915,110.
Patented Mar. 16, 1909.
2 SHEETS—SHEET 2.
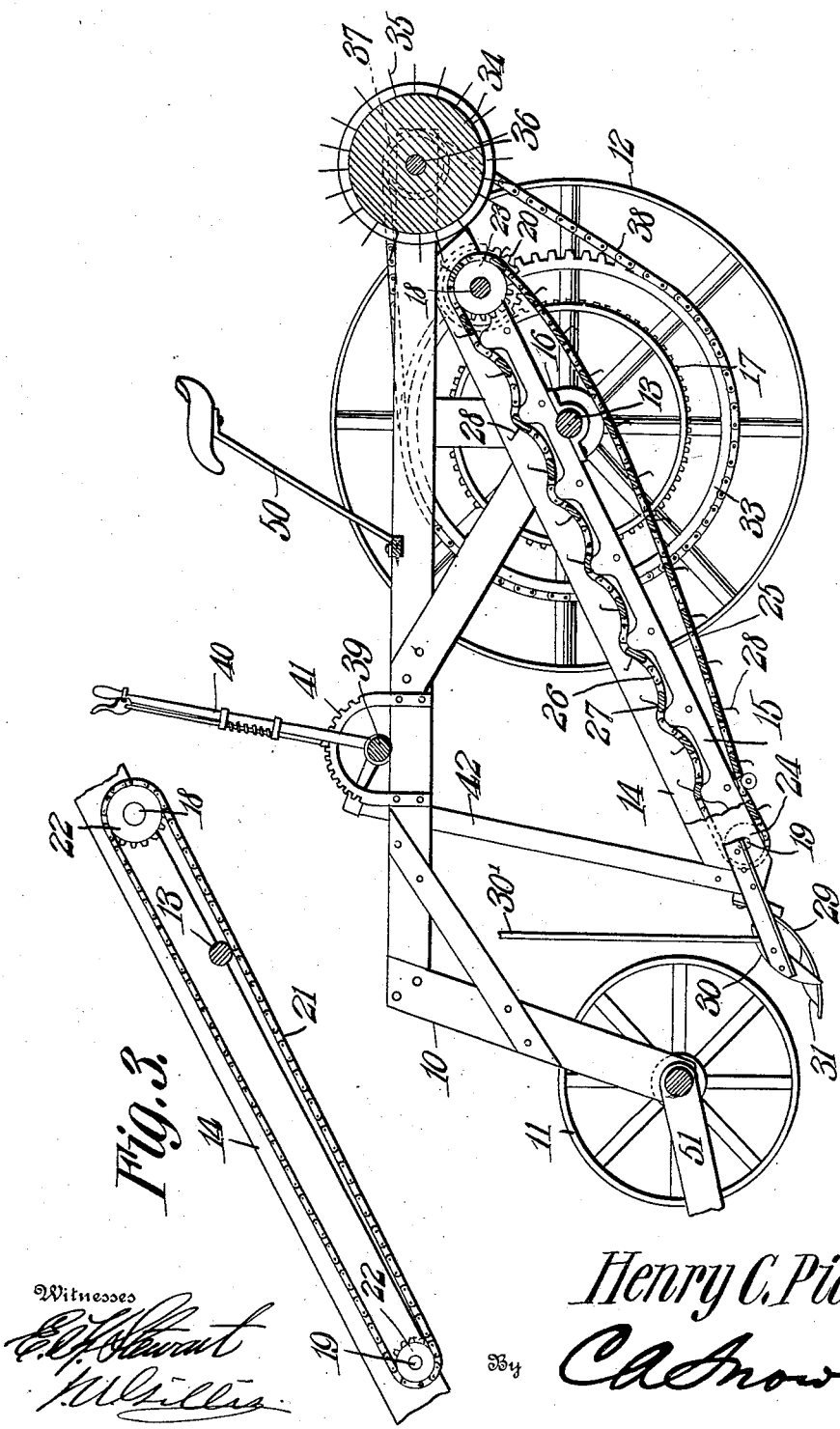
Witnesses
Inventor
Henry C. Pickel,
By C. A. Snow & Co.
Attorneys

UNITED STATES PATENT OFFICE.

HENRY C. PICKEL, OF MANKATO, MINNESOTA.

QUACK-GRASS EXTERMINATOR.

No. 915,110.  Specification of Letters Patent.  Patented March 16, 1909.

Application filed March 13, 1908. Serial No. 420,880.

*To all whom it may concern:*

Be it known that I, HENRY C. PICKEL, a citizen of the United States, residing at Mankato, in the county of Blue Earth and State of Minnesota, have invented a new and useful Quack-Grass Exterminator, of which the following is a specification.

This invention relates to agricultural implements, and more especially to that class of implements known as quack grass exterminators.

The objects of this invention are to remove obnoxious weeds, such as quack grass, and the like, from the earth, tear them to pieces, and deposit them upon the surface of the ground in order that they may be dried up and destroyed by the sun's rays.

A further object of the invention is to provide a means whereby when such weeds are removed from the ground, the earth clinging to the roots may be separated from them, so that the action of the sun on the roots may be unobstructed.

A further object of the invention is to deposit the separated earth in advance of the deposition of the weeds, thus placing them entirely upon the surface.

The invention consists broadly of means for digging the weeds, followed by means for separating the earth therefrom, and this in turn followed by means for tearing to pieces and depositing them upon the earth previously separated.

In the accompanying drawings:—Figure 1 is a perspective view of my invention. Fig. 2 is a longitudinal section thereof. Fig. 3 is a detail thereof showing the conveyer driving chain.

Similar numerals of reference are employed to indicate corresponding parts throughout the several figures of the drawings.

The numeral 10 indicates the frame of the device at the forward end whereof are mounted wheels 11. Toward the rear end of this frame are mounted wheels 12, on an axle 13. Carried on this axle 13 is a conveyer frame, the ladder 14 having corrugated bars 15 arranged on the inside thereof. This ladder is pivotally mounted on the axle 13 by any suitable means, as the bearings 16. A gear 17 is mounted upon the shaft 13 and held to rotate therewith. At the upper end of the ladder 14 is carried a shaft 18, and at the lower end thereof is a shaft 19. A gear 20 secured to the shaft 18 is arranged to mesh with the gear 17 previously mentioned. A sprocket chain 21 carried on sprockets 22 serves to actuate the axle 19. Sprockets 23 are mounted on the axle 18 to rotate therewith at the upper end of the conveyer frame and sprockets 24 are similarly mounted on the axle 19 at the lower end thereof. An endless conveyer belt 25 comprising sprocket chains 26 having spaced bars 27 extending therebetween, is held upon the last mentioned sprockets and adapted to be actuated thereby. The bars 27 are provided throughout their length with teeth 28 arranged at approximately right angles to said bars. The endless belt 25 is held upon its sprocket wheels in such manner that the upper surface thereof will be loose, thus permitting the sprocket chains 26 to pass over the corrugated bars 15 in a series of loops or depressions, as clearly shown in Fig. 2. At the lower end of the conveyer frame is secured a plow 29 and an independent colter 30 braced to the frame 10 by a rod 30'. This plow is preferably made in a V-shape, with a raised center, as shown at 31, with shearing edges 32 on each side of said center. A sprocket gear 33 is, also, mounted on shaft 13 and arranged to rotate therewith. A disintegrator drum 34 provided with teeth 35 is carried on a shaft 36 at the rear portion of the frame 10. Upon the shaft 36 is keyed a sprocket 37 and a chain 38 connects the sprocket 37 with the driving sprocket 33, thus serving to actuate the drum 34. Upon the frame is mounted a rock shaft 39 and a latch lever 40 is carried upon said rock shaft to actuate the same. A quadrant 41 is held upon said frame in the path of the latch lever to retain the same in any desired position. Links 42 are attached to the arms of the rock shaft 39 at their upper ends, and to the lower end of the conveyer frame 14 at their lower ends. It will be readily seen that by the movement of the latch lever 40, the lower end of the frame 14 may be raised or depressed, as desired, thus regulating the depth at which the plow 29 operates to meet the various requirements that may be found necessary.

A seat 50 is provided above the frame 10 for the operator, and a tongue 51 affords means for attaching draft animals to the digger.

In the operation of my device, the plow 29 having been set to the desired depth, the machine is pulled forward and the weeds thus pulled up are carried up the base of the plow and deposited on the conveyer 25, being there caught and held by the teeth 28. As the machine moves forward, the conveyer belt is drawn up over the corrugated bars 15 and the mass of weeds and dirt held thereon is shaken about, freeing the weeds from the dirt and permitting the latter to drop through the spaces between the bars and to the ground, so that when the weeds reach the upper end of the conveyer they are practically free from adhering earth. The arrangement of the speeds of the conveyer and the picker drum is such that the drum revolves at a relatively higher rate of speed than the conveyer belt moves. The effect of this is that when the weeds and roots are brought up to the upper end of the conveyer, the rapidly moving teeth of the disintegrator drum pick them into minute portions, and they are then dropped upon the surface of the earth, so that the full effect of the sun's rays may be had thereon, thus serving to dry up the roots. It will be observed that by the arrangement of the conveyer belt driving mechanism, the belt is fed forward over the sprocket 24 as fast as it is drawn forward by the upper sprocket, thus maintaining the upper surface of the belt in a slack condition, so that at no time will it be drawn in a straight line between the upper sides of such sprockets, but will constantly follow the outline of the corrugated bars 15.

It is obvious that many changes might be made in the device, as, for instance, it may be found advisable to replace the teeth 35 which are here shown as of straight type, with knives or the like. I do not, therefore, desire to confine myself to the exact form here shown and described, but wish to cover all such as properly come within the scope of the invention.

What is claimed is:—

In a machine of the class described, an inclined conveyer frame comprising a pair of parallel side bars, agitating bars secured thereto and provided with widely spaced upwardly extending rounded teeth, a pair of shafts journaled in the bars and extending at one side beyond the outer edge of the frame, a pair of sprocket wheels carried by each shaft at points in alinement with the agitating bars, link belts extending over said sprocket wheels and arranged to ride over the agitating teeth in undulatory lines, the upper runs of the chains being of greater length than the lower runs thereof, conveyer bars extending between said link belts and of a width less than the distance between adjacent teeth of the agitating bars to thereby permit free flexing of the entire conveyer, driving sprockets arranged on the projecting ends of the two shafts, and a link belt connecting the driving sprockets and serving to impart positive driving movement to both ends of the conveyer to thereby maintain the proper relative lengths of the upper and lower runs of said conveyer.

In testimony that I claim the foregoing as my own, I have hereto affixed my signature in the presence of two witnesses.

HENRY C. PICKEL.

Witnesses:
W. B. DAVIES,
ED WEAVER.